United States Patent
Masuzawa et al.

(10) Patent No.: US 6,908,568 B2
(45) Date of Patent: Jun. 21, 2005

(54) PREPARATION OF OXIDE MAGNETIC MATERIAL AND OXIDE MAGNETIC MATERIAL

(75) Inventors: Kiyoyuki Masuzawa, Haibara-gun (JP); Hitoshi Taguchi, Fujieda (JP)

(73) Assignee: TDK Corporation, Tokyo (JP)

( * ) Notice: Subject to any disclaimer, the term of this patent is extended or adjusted under 35 U.S.C. 154(b) by 435 days.

(21) Appl. No.: 10/171,598

(22) Filed: Jun. 17, 2002

(65) Prior Publication Data

US 2003/0230832 A1 Dec. 18, 2003

(51) Int. Cl.$^7$ .............................. H01F 1/34; H01F 41/02
(52) U.S. Cl. ................ 252/62.56; 252/62.58; 252/62.57; 252/62.59; 252/62.6; 252/62.61; 252/62.62; 252/62.63; 252/62.64; 264/611; 264/427; 264/428; 501/1; 501/126
(58) Field of Search .................. 264/611, 427, 264/428; 252/62.56, 62.57, 62.58, 62.59, 62.6, 62.61, 62.62, 62.63, 62.64; 501/1, 126

(56) References Cited

U.S. PATENT DOCUMENTS

| | | | |
|---|---|---|---|
| 4,267,065 A | 5/1981 | Johnson et al. | |
| 5,951,937 A | * 9/1999 | Taguchi et al. | 264/427 |
| 6,086,781 A | 7/2000 | Taguchi et al. | |
| 6,139,766 A | 10/2000 | Taguchi et al. | |
| 6,248,253 B1 | 6/2001 | Taguchi et al. | |
| 6,258,290 B1 | 7/2001 | Taguchi et al. | |
| 6,402,980 B1 | 6/2002 | Taguchi et al. | |
| 6,790,907 B2 | * 9/2004 | Takata et al. | 524/833 |

FOREIGN PATENT DOCUMENTS

| | | | |
|---|---|---|---|
| JP | 05-159918 | * | 6/1993 |
| JP | 6-112029 | | 4/1994 |

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

An oxide magnetic material is prepared by wet molding in a magnetic field a slurry containing a particulate oxide magnetic material, water and a polyhydric alcohol having the formula: $C_n(OH)_nH_{n+2}$ wherein n is from 4 to 100 as a dispersant. By improving the orientation in a magnetic field upon wet molding using water, an oxide magnetic material having a high degree of orientation, typically an anisotropic ferrite magnet, is obtained at a high rate of productivity. The method is advantageous from the environmental and economical standpoints.

18 Claims, No Drawings

PREPARATION OF OXIDE MAGNETIC MATERIAL AND OXIDE MAGNETIC MATERIAL

This invention relates to a method for preparing oxide magnetic materials, typically anisotropic ferrite magnets, and the oxide magnetic materials obtained thereby.

BACKGROUND OF THE INVENTION

At present, hexagonal strontium ferrite and barium ferrite are used as the oxide permanent magnet material. To improve magnetic properties, these magnets are often given anisotropy by pressing in a magnetic field. One of magnetic properties is a residual magnetic flux density or remanence Br. Factors largely affecting the remanence Br have the following relationship. It is noted that a saturation magnetization (σs) per unit weight in the following formula is a value intrinsic to a material.

Br ∝(saturation magnetization per unit weight)×(density)×(degree of orientation)

Therefore, for the manufacture of anisotropic sintered ferrite magnets having high Br, it is very important to increase the sintered density and the degree of orientation. One common practice employed in the prior art for achieving a high degree of orientation is to mold a slurry having ferrite particles dispersed in water, that is, wet molding. For providing high coercivity, on the other hand, it is necessary to reduce the size of ferrite particles to or below the critical single domain diameter of 1 μm for defining single domains. Such particles have the problem that the degree of orientation generally lowers even when the wet molding technique is used. The probable causes include (1) a likelihood of submicron particles to coalesce, (2) an increase of magnetic coalescence as a result of dividing particles into single domains, (3) a decrease of torque for particles to orient in a magnetic field direction, and (4) an increase of frictional force due to the increased surface area of particles.

For solving this problem, we found that the magnetic coalescence can be reduced by introducing comminution strains into submicron ferrite particles to temporarily reduce the coercivity thereof (see JP-A 6-53064).

We further found that by using an organic solvent such as toluene or xylene instead of water and adding a surfactant such as oleic acid, a degree of magnetic orientation of about 98% at maximum is achievable even with submicron ferrite particles (see also JP-A 6-53064). However, the organic solvent used in this method is detrimental to the human body and the environment. The solvent problem can be solved by a set of large-size recovery and related units, which requires an increased cost.

It is noted that the degree of magnetic orientation used in this specification is a ratio (Ir/Is) of residual magnetization (Ir) to saturation magnetization (Is).

On the other hand, for improving a degree of orientation in the wet magnetic field molding technique using water, it was attempted in the prior art to add a polymeric dispersant as typified by a polycarboxylic acid (or salt) to magnetic particles and allow the dispersant to be adsorbed on the surfaces of magnetic particles whereby the particles are dispersed by virtue of steric hindrance and electrical repulsion, thereby improving a degree of orientation (see JP-A 6-112029). Nevertheless, the degree of orientation and remanence Br thus accomplished are not so high.

Understandably, the problem that the degree of orientation deteriorates as the particle diameter decreases arises not only in the manufacture of ferrite magnets, but also when other particulate oxide magnetic materials such as needle soft magnetic ferrite are oriented in a magnetic field.

We proposed in U.S. Pat. No. 5,951,937 a means of improving the orientation of magnetic particles in a magnetic field during the wet molding step using water by adding a dispersant as typified by gluconic acid or a neutralized salt thereof or a lactone thereof, which means is advantageous from the environmental and economical standpoints. This method is highly effective in improving the degree of orientation, but adversely affects the ability of wet molding in a magnetic field, sometimes leading to an unacceptable decline of productivity.

SUMMARY OF THE INVENTION

An object of the present invention is to provide a method of preparing oxide magnetic materials such as anisotropic ferrite magnets wherein an oxide magnetic material having a high degree of orientation is obtained at a high productivity by improving the orientation in a magnetic field upon wet molding using water, which is advantageous from the environmental and economical standpoints.

The present invention provides a method for preparing an oxide magnetic material, comprising the step of wet molding a slurry containing a particulate oxide magnetic material and water in a magnetic field to form a molded part. The slurry should further contain a polyhydric alcohol having the general formula: $C_n(OH)_nH_{n+2}$ as a dispersant.

Preferably, the number of carbon atoms, n, in the polyhydric alcohol is at least 4. Also preferably, the number of carbon atoms (n) is up to 100, and more preferably up to 20. Most often, the polyhydric alcohol is sorbitol or mannitol. In one preferred embodiment, the dispersant is added in an amount of 0.05 to 5.0% by weight based on the particulate oxide magnetic material. The particulate oxide magnetic material preferably has an average particle diameter of up to 1 μm.

The method may further include a wet comminution step prior to the molding step, and preferably, at least a portion of the dispersant is added in the wet comminution step. The method may further include a dry coarse comminution step prior to the wet comminution step, and preferably, at least a portion of the dispersant is added in the dry coarse comminution step. The method may further include the step of firing the molded part into a sintered part.

Also contemplated herein is an oxide magnetic material obtained by the method defined above.

We discovered that a degree of orientation can be increased by adding a compound having a highly hydrophilic group such as gluconic acid (U.S. Pat. No. 5,951,937). The addition of a hydroxycarboxylic acid as typified by gluconic acid or a neutralized salt thereof or a lactone thereof as the dispersant achieves a significantly improved degree of orientation, but tends to aggravate the ability of molding in a magnetic field, sometimes giving rise to problems including an extension of molding time and a lowering of molding yield. Since the use of these dispersants tends to incur cracks in molded parts upon drying, the conditions under which molded parts are dried must be carefully set. On the other hand, sorbose and analogues are devoid of such problems as inefficient molding, but their improvement in the degree of orientation is not so significant as gluconic acid and other hydroxycarboxylic acids.

Further, when gluconic acid and analogues which exhibit acidity in aqueous solution are used as the dispersant, it is necessary to adjust the pH of the slurry by adding basic compounds or neutralized salts thereof. The preceding method suffered from the problems that the degree of orientation is readily affected by the pH and the dispersant can react with the oxide magnetic material or additives such as calcium carbonate. By contrast, the present invention eliminates these problems because the dispersant used herein is free of acidic groups such as carboxyl.

Making a study on a variety of compounds, we have discovered that the addition of a polyhydric alcohol such as sorbitol can improve both the degree of orientation and moldability. The polyhydric alcohol tends to prevent molded parts from cracking.

The present invention is advantageous in manufacturing cost since the dispersants used herein such as sorbitol are relatively inexpensive.

In this way, an oxide magnetic material having a high degree of orientation can be produced at a low cost using the dispersant as defined herein.

Most of polymeric dispersants used thus far are artificial synthesized ones which are least bio-degradable, imposing the problem of disposal of used solution. In contrast, most of the dispersants used in the present invention are naturally occurring ones which are safe to the human body and the environment and have the additional advantage of bio-degradation.

Among the dispersants used herein, those compounds which are ascertained to be especially effective for increasing a degree of orientation are sorbitol and mannitol. Sorbitol and mannitol are optical isomers that have the same molecular formula and differ only in steric structure. It is believed that other optical isomers exhibit the same performance as sorbitol.

Specifically stated, in an example wherein submicron ferrite particles are wet comminuted using water as a dispersing medium, molded and sintered, the degree of magnetic orientation is 93 to 94% when no dispersants are added and about 94% when polycarboxylic acid type compounds conventionally used as the dispersant are used, but increases to 95 to 97% when sorbitol is used as the dispersant, which is equivalent to the use of gluconic acid. Since a degree of magnetic orientation of 97 to 98% is accomplished by using an organic solvent (xylene) as the dispersing medium and oleic acid as the dispersant, the present invention is successful in accomplishing a high degree of magnetic orientation approximate to that achieved with organic solvents, despite the use of water as the dispersing medium.

In the process of manufacturing ferrite magnets, $SiO_2$ and $CaCO_3$ are added as auxiliary components. When a hydroxycarboxylic acid such as gluconic acid or lactone thereof is used as the dispersant, part of $SiO_2$ and $CaCO_3$ can be carried away along with the supernatant of a molding slurry during the preparation and wet molding thereof. When a basic compound for pH adjustment is additionally added along with the hydroxycarboxylic acid or lactone thereof to increase the pH of the slurry, more $SiO_2$ and $CaCO_3$ are carried away.

In contrast, the use of a polyhydric alcohol as the dispersant has the additional advantage of preventing $SiO_2$ and $CaCO_3$ from leaching out and thus restraining concomitant property deterioration such as HcJ lowering.

DESCRIPTION OF THE PREFERRED EMBODIMENTS

Although the present invention is applicable to the preparation of various oxide magnetic materials, the invention is described below as being applied to the preparation of anisotropic ferrite magnets because of outstanding advantages obtained therefrom.

The anisotropic ferrite magnets to which the invention is applied are, in most cases, hexagonal ferrite materials of the magnetoplumbite type having M, W and other phases. These ferrites are preferably represented by $MO \cdot nFe_2O_3$ wherein M is preferably at least one of strontium and barium and n is from 4.5 to 6.5. These ferrites may further contain rare earth elements, Ca, Pb, Si, Al, Ga, Sn, Zn, In, Co, Ni, Ti, Cr, Mn, Cu, Ge, Nb, Zr, etc.

More preferred are magnetic materials having as the primary phase a hexagonal magnetoplumbite type (M type) ferrite in which the proportions of the respective metal elements A, R, Fe and L to the total of the metal elements are:

A: 1 to 13 at %,
R: 0.05 to 10 at %,
Fe: 80 to 95 at %, and
L: 0.1 to 5 at % wherein A is at least one element selected from strontium, barium, calcium, and lead, R is at least one element selected from rare earth elements (inclusive of yttrium) and bismuth, and L is cobalt and/or zinc.

In this embodiment, the magnetic material preferably forms the primary phase represented by the formula (I):

$$A_{1-x}R_x(Fe_{12-y}L_y)_zO_{19} \qquad (I)$$

wherein x, y, and z are values calculated from the above-defined quantities, provided that R is located at the site of A and L is located at the site of Fe.

The more preferred proportions of the respective metal elements are:

A: 3 to 11 at %,
R: 0.2 to 6 at %,
Fe: 83 to 94 at %, and
L: 0.3 to 4 at %, and especially A: 3 to 9 at %,
R: 0.5 to 4 at %,
Fe: 86 to 93 at %, and
L: 0.5 to 3 at %.

Among the above-described constituent elements, A is at least one element selected from strontium, barium, calcium, and lead, and preferably always contains strontium. A too lower proportion of A may form no M type ferrite or form more non-magnetic phases such as $\alpha\text{-}Fe_2O_3$. A too higher proportion of A may form no M type ferrite or form more non-magnetic phases such as $SrFeO_{3-x}$. The proportion of strontium in A is preferably at least 51 at %, more preferably at least 70 at %, most preferably 100 at %. If the proportion of strontium in A is too low, improvements in both saturation magnetization and coercivity may not be obtainable.

R is at least one element selected from rare earth elements (inclusive of yttrium) and bismuth. Preferably R contains lanthanum, praseodymium or neodymium, and especially always contains lanthanum. A too lower proportion of R may form a smaller amount of solid solution of L, encountering difficulty in achieving its effect. A too higher proportion of R may form more non-magnetic hetero phases such as ortho-ferrite. The proportion of lanthanum in R is preferably at least 40 at %, more preferably at least 70 at %, with the sole use of lanthanum as R being most preferred for improving the saturation magnetization. This is because lanthanum has the highest extent of solid solution when the extent of solid solution with hexagonal M type ferrite is compared.

Accordingly, if the proportion of lanthanum in R is too low, the amount of solid solution of R cannot be increased and as a result, the amount of solid solution of element L cannot be increased, resulting in the reduced effect of L. The combined use of bismuth is advantageous in productivity since the calcining and sintering temperatures become lower.

The element L is cobalt and/or zinc and preferably always contains cobalt. The proportion of cobalt in L is preferably at least 10 at %, more preferably at least 20 at %. A too low proportion of cobalt may provide an insufficient improvement in coercivity.

The anisotropic ferrite sintered magnet described above is prepared by mixing source oxides of the ferrite composition or compounds which will convert into oxides upon firing, and calcining the mixture. Calcination may be carried out in air, for example, at 1,000 to 1,350° C. for 1 second to 10 hours and at 1,000 to 1,200° C. for 1 second to 3 hours if it is desired to produce fine calcined powder of M type strontium ferrite.

The thus calcined powder consists of granular particles having a substantially magnetoplumbite ferrite structure, with the primary particles preferably having an average particle diameter of 0.1 to 1 $\mu$m, especially 0.1 to 0.5 $\mu$m. The average particle diameter, which may be determined from an observation under a scanning electron microscope (SEM), usually has a coefficient of variation CV of up to 80%, especially 10 to 70%. Also preferably, the calcined powder has a saturation magnetization $\sigma$s of 65 to 80 emu/g, and especially 65 to 71.5 emu/g for M type strontium ferrite, and a coercive force HcJ of 2,000 to 8,000 Oe, and especially 4,000 to 8,000 Oe for M type strontium ferrite.

The invention carries out wet molding using a molding slurry containing a particulate oxide magnetic material, water as a dispersing medium, and a dispersant. To enhance the action of the dispersant, a wet comminution (or milling) step is preferably carried out prior to the wet molding step. Also, when the particulate oxide magnetic material used is calcined particles, which are usually granular, a dry coarse comminution (or pulverizing) step is preferably provided prior to the wet comminution step for pulverizing or disintegrating the calcined particles. When the particulate oxide magnetic material is prepared by a co-precipitation or hydrothermal synthetic process, the dry coarse comminution step is usually omitted and the wet comminution step is not essential although the wet comminution step is preferably provided in order to enhance the degree of orientation. In the following description, reference is made to the embodiment wherein calcined particles are used as the particulate oxide magnetic material and both the dry coarse comminution step and the wet comminution step are employed.

In the dry coarse comminution step, comminution is continued until the BET specific surface area is increased by a multiplicative factor of about 2 to about 10. At the end of comminution, the particles preferably have an average particle diameter of about 0.1 to 1 $\mu$m and a BET specific surface area of about 4 to 10 m$^2$/g while the coefficient of variation CV of the particle diameter is preferably maintained at 80% or lower, especially 10 to 70%. The comminution means is not critical. Dry vibration mills, dry attritors (medium agitation mills), and dry ball mills are useful, with the dry vibration mills being preferred. The comminution time may be properly determined in accordance with a particular comminution means.

The dry coarse comminution is also effective for reducing coercivity HcJ by introducing lattice strains into the calcined particles. The reduced coercivity restrains the coalescence of particles, resulting in improved dispersion and an improved degree of orientation. The lattice strains introduced into particles are relieved in the subsequent sintering step whereby the material resumes the intrinsic hard magnetism, becoming a permanent magnet.

In the dry coarse comminution step, SiO$_2$ and CaCO$_3$ which will convert to CaO upon firing are usually added. Part of SiO$_2$ and CaCO$_3$ may be added prior to calcination whereupon some improvements in characteristics are acknowledged.

Following the dry coarse comminution, a slurry containing the calcined particles and water is prepared and subjected to wet comminution. The content of calcined particles in the slurry to be milled is preferably about 10% to about 70% by weight. The comminution means used in wet comminution is not critical. Usually, ball mills, attritors, and vibration mills are useful. The comminution time may be properly determined in accordance with a particular comminution means.

At the end of wet comminution, the comminuted slurry is concentrated into a molding slurry. Concentration may be done as by centrifugation. The content of calcined particles in the molding slurry is preferably about 60% to about 90% by weight.

In the wet molding step, the molding slurry is molded in a magnetic field. The molding pressure may be about 0.1 to 0.5 ton/cm$^2$ and the applied magnetic field may be about 5 to 15 kOe.

The present invention uses the molding slurry to which the dispersant is added. The dispersant used herein is a polyhydric alcohol having the general formula: $C_n(OH)_nH_{n+2}$.

The polyhydric alcohols used herein are those in which the number of carbon atoms, represented by n, is at least 4, preferably from 4 to 100, more preferably from 4 to 30, even more preferably from 4 to 20, and most preferably from 4 to 12. No benefits are obtained when the number of carbon atoms (n) is 3 or less.

The general formula representative of the polyhydric alcohol corresponds to the situation where the skeleton is entirely chain-like and free of unsaturation. The numbers of hydroxyl groups and hydrogen atoms in the polyhydric alcohol may be more or less than those represented by the general formula. The polyhydric alcohol may either be saturated or contain an unsaturated bond. Its basic skeleton may be either chain-like or cyclic, with the chain-like skeleton being preferred. The benefits of the invention are obtainable when the number of hydroxyl groups is at least 50% of the number of carbon atoms, n, although a greater number of hydroxyl groups are preferable. Most preferably the number of hydroxyl groups is equal to the number of carbon atoms.

It is noted that of the polyhydric alcohols satisfying the above requirements, those compounds having enol form hydroxyl groups dissociable as an acid are excluded from the present invention because they are covered by the patent (U.S. Pat. No. 5,951,937) by the present inventors.

The preferred dispersants used herein are sorbitol and mannitol wherein n=6.

These preferred dispersants are represented by the following structure.

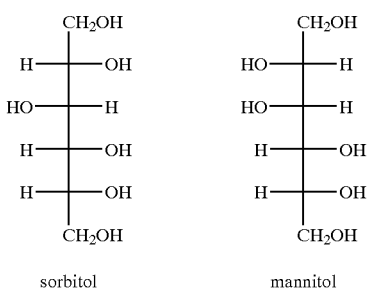

sorbitol   mannitol

There is a possibility that the dispersant used herein change its structure through mechanochemical reaction induced by comminution.

Furthermore, the objects of the invention can be attained by adding an ester or similar compound which will form the same organic compound as the dispersant used herein, for example, through hydrolytic reaction.

It is understood that a mixture of two or more dispersants may be used. The other dispersant used in combination with the inventive dispersant is not limited to the scope of the invention.

The amount of the dispersant added is preferably 0.05 to 5.0%, more preferably 0.1 to 3.0%, even more preferably 0.3 to 2.0%, and most preferably 0.5 to 1.5% by weight, based on the weight of the calcined particles used as the particulate oxide magnetic material. A too smaller amount of the dispersant would achieve an insufficiently improved degree of orientation whereas with a too larger amount of the dispersant, the molded part or sintered body would become likely to crack.

The stage when the dispersant is added is not critical. The dispersant may be added at the dry coarse comminution step or during the preparation of a slurry to be milled in the wet comminution step, or part of the dispersant may be added at the dry coarse comminution step and the remainder added at the wet comminution step. Alternatively, the dispersant may be added as by agitation after the wet comminution step. In any case, the dispersant is present in the molding slurry, ensuring that the advantages of the invention are achievable. Understandably, the addition of the dispersant during comminution, especially dry coarse comminution is more effective for improving the degree of orientation. It is noted that when the dispersant is added in divided portions, the addition amounts of the respective portions are determined so that the total of the addition amounts may fall in the preferred range described above.

At the end of the molding step, the molded part is heat treated at a temperature of 100 to 500° C. in air or nitrogen whereby the dispersant added is thoroughly decomposed and removed. In the subsequent firing step, the molded part is sintered, for example, in air preferably at a temperature of 1,150 to 1,250° C., more preferably 1,160 to 1,220° C. for about ½ to about 3 hours, obtaining an anisotropic ferrite magnet.

It is understood that a sintered magnet may also be obtained from the molded part prepared by the present invention by disintegrating the molded part by means of a crusher or the like, effecting classification through a sieve or screen so as to collect a fraction of magnetic field-orientable granules having an average particle diameter of about 100 to 700 μm, and dry shaping the granules in a magnetic field, followed by sintering.

There has been described the embodiment wherein the invention is applied to the preparation of anisotropic ferrite magnets. Even when the invention is applied to the preparation of other oxide magnetic materials such as soft magnetic ferrite sintered bodies using acicular ferrite particles or the like, for example, the dispersion of oxide magnetic material particles in the molding slurry is improved by adding the dispersant in line with the above teaching and eventually, oxide magnetic materials having a higher degree of orientation are obtainable.

When the sintered ferrite magnets prepared by the method of the invention are used, the following advantages are generally obtained so that excellent applied products are obtainable. More particularly, provided that applied products are of the same shape as conventional ferrite products, the magnets, which generate a more magnetic flux density, contribute to improvements in performance of the products, for example, the achievement of higher torque in the case of motors, and the achievement of sound quality with improved linearity due to the strengthened magnetic circuit in the case of speakers or headphones. Also, if applied products may have the same function as the prior art products, the dimensions (thickness) of magnets can be reduced (thinner), contributing to size and weight reductions (flattening).

The sintered ferrite magnets prepared by the method of the invention will find a wide variety of applications as described below after they are worked to the desired shape.

The magnets are advantageously used in automotive motors for fuel pumps, power windows, ABS, fans, wipers, power steering, active suspensions, starters, door locks and mirrors; motors for business machines and audio-visual equipment such as FDD spindles, VCR capstans, VCR rotary heads, VCR reels, VCR loading, VCR camera capstans, VCR camera rotary heads, VCR camera zoom, VCR camera focus, tape cassette capstans, CD, LD, and MD drive spindles, CD, LD and MD loading, CD and LD optical pickups; motors for household appliances such as air conditioner compressors, refrigerator compressors, electric tools, fans, microwave oven fans, microwave oven plate rotation, mixer driving, dryer fans, shaver driving, and power toothbrushes; motors for factory automation equipment such as robot shafts, connection drives, robot drives, machine tool table drives, and machine tool belt drives; and miscellaneous units including motorcycle generators, speaker magnets, headphone magnets, magnetron tubes, MRI magnetic field generating systems, CD-ROM clamps, distributor sensors, ABS sensors, fuel/oil level sensors, and magnet latches.

EXAMPLE

Examples of the invention are given below by way of illustration and not by way of limitation.

Example 1

To achieve the desired composition:

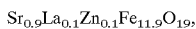

the starting raw materials shown below were used.
Fe$_2$O$_3$ powder (containing Mn, Cr, Si and Cl impurities)
SrCO$_3$ powder (containing Ba and Ca impurities)
ZnO powder
La$_2$O$_3$ powder
As additives, SiO$_2$ and CaCO$_3$ powders were added in amounts of 0.2% and 0.15% by weight based on the desired composition.

The starting raw materials and additives were comminuted in a wet attritor, dried, classified, and then fired in air at 1,230° C. for 3 hours, yielding a granular calcined material.

The calcined material was measured for magnetic properties by means of a vibrating sample magnetometer (VSM), finding a saturation magnetization σs of 72 emu/g and a coercive force HcJ of 4.4 kOe.

To the calcined material were added 0.4% by weight of $SiO_2$ and 1.05% by weight of $CaCO_3$. The mixture was subjected to dry coarse comminution in a vibrating mill. At this point, comminution introduced strains into the calcined particles to reduce their HcJ to 1.7 kOe.

The calcined particles were then mixed with water as a dispersing medium and sorbitol as a dispersant to form a slurry to be milled. The amount of sorbitol added to the calcined particles is shown in Table 1. The slurry to be milled had a solid concentration of 34% by weight.

The slurry to be milled was subjected to wet comminution in a ball mill for 40 hours. At the end of wet comminution, a specific surface area of 8.5 $m^2/g$ (average particle diameter of 0.5 μm) was reached. The supernatant of the slurry at the end of wet comminution had a pH value shown in Table 1.

After the completion of wet comminution, the comminuted slurry was centrifuged and adjusted until the concentration of calcined particles in the slurry reached 75% by weight, obtaining a molding slurry. The molding slurry was compression molded while removing water therefrom. This molding was carried out under a magnetic field of about 10 kOe applied in the compression direction while one cycle took 1.5 minutes. The molded part was a cylindrical one having a diameter of 30 mm and a height of 18 mm. Table 1 reports the frequency of cracking incurred in the molded part due to difficult parting from the mold.

The degree of magnetic orientation (Ir/Is) of the molded part cannot be accurately evaluated since it is also affected by the density. Then X-ray diffractometry analysis was carried out on the flat surface of the molded part. The degree of crystallographic orientation (or degree of orientation by X-ray) of the molded part was determined from the face index and intensity of the peaks that appeared in the diffractometry. The results are shown in Table 1. The degree of magnetic orientation of the sintered part is dictated by the degree of orientation by X-ray of the molded part to a considerable extent. It is noted that the degree of orientation by X-ray is represented by $\Sigma I(00L)/\Sigma I(hkL)$ in this specification. Note that (00L) is a general expression representing c faces such as (004) and (006), and $\Sigma I(00L)$ is the total of peak intensities of all (00L) faces. (hkL) represents all detected peaks and $\Sigma I(hkL)$ is the total of intensities thereof. Therefore, $\Sigma I(00L)/\Sigma I(hkL)$ represents the extent of c-face orientation.

Next, the molded parts were fired in air at 1,200° C. for one hour. It is noted that the molded part was fully burned out at 100 to 360° C. in air to remove the sorbitol before firing. The sintered parts thus obtained were measured for remanence Br, coercive force HcJ, degree of orientation Ir/Is, squareness ratio Hk/HcJ, and sintered density, with the results shown in Table 2. It is noted that Hk is the strength of an external magnetic field at which the magnetic flux density in the second quadrant of the magnetic hysteresis loop reaches 90% of the remanence. With low values of Hk, high energy products are not obtainable. Hk/HcJ is an index of magnet performance and represents the degree of squareness in the second quadrant of the magnetic hysteresis loop.

Example 2

Molded parts and sintered parts were obtained as in Example 1 except that an appropriate amount of aqueous ammonia was added for pH adjustment during the comminution step. The molded parts and sintered parts were measured as in Example 1, with the results shown in Tables 1 and 2.

Comparative Example 1

Molded parts and sintered parts were obtained as in Example 1 except that gluconic acid was added instead of sorbitol. The addition amount of gluconic acid reported in Table 1 is different from the amount of sorbitol on a percent by weight basis, but identical therewith on a molar basis. The molded parts and sintered parts were measured as in Example 1, with the results shown in Tables 1 and 2.

Comparative Example 2

Molded parts and sintered parts were obtained as in Comparative Example 1 except that an appropriate amount of aqueous ammonia was added for pH adjustment during the comminution step. The molded parts and sintered parts were measured as in Example 1, with the results shown in Tables 1 and 2.

Comparative Example 3

Molded parts and sintered parts were obtained as in Example 1 except that sorbitol was not added. The molded parts and sintered parts were measured as in Example 1, with the results shown in Tables 1 and 2.

Comparative Example 4

Molded parts and sintered parts were obtained as in Comparative Example 3 except that an appropriate amount of aqueous ammonia was added for pH adjustment during the comminution step. The molded parts and sintered parts were measured as in Example 1, with the results shown in Tables 1 and 2.

TABLE 1

| | Dispersant | Amount of dispersant added (wt %) | pH | Degree of orientation by X-ray of molded part, $\Sigma I(00L)/\Sigma I(hkL)$ | Frequency of cracking upon parting |
|---|---|---|---|---|---|
| EX 1 | sorbitol | 0.93 | 9.0 | 0.57 | 1/5 |
| EX 2 | sorbitol | 0.93 | 10.1 | 0.57 | 2/5 |
| CE 1 | gluconic acid | 1 | 8.5 | 0.55 | 3/5 |
| CE 2 | gluconic acid | 1 | 10.3 | 0.58 | 3/5 |
| CE 3 | none | — | 8.7 | 0.45 | 1/5 |
| CE 4 | none | — | 9.9 | 0.46 | 0/5 |

TABLE 2

| | Dispersant | Amount of dispersant added (wt %) | Br (G) | HcJ (Oe) | Ir/Is (%) | Hk/HcJ (%) | Sintered density (g/cm³) |
|---|---|---|---|---|---|---|---|
| EX 1 | sorbitol | 0.93 | 4320 | 3630 | 95.1 | 93.1 | 5.01 |
| EX 2 | sorbitol | 0.93 | 4290 | 3610 | 94.7 | 95.1 | 5.02 |
| CE 1 | gluconic acid | 1 | 4220 | 3720 | 94.3 | 96.6 | 4.98 |
| CE 2 | gluconic acid | 1 | 4310 | 3490 | 95.2 | 94.0 | 4.99 |
| CE 3 | none | — | 4200 | 3670 | 93.0 | 95.4 | 5.01 |
| CE 4 | none | — | 4200 | 3610 | 93.2 | 97.1 | 5.02 |

It is evident from Table 1 that like gluconic acid, the addition of sorbitol is effective for improving the degree of orientation by X-ray of a molded part. Although the degree of orientation achieved by addition of gluconic acid depends on the pH of the slurry, the system with sorbitol added is less pH dependent and provides a consistent degree of orientation.

The frequency of cracking upon parting is lower with sorbitol than with gluconic acid, indicating that the use of sorbitol as the dispersant has less influence on moldability. When gluconic acid is used, defective molding such as cracking upon parting can be avoided by slowing down the molding speed at the sacrifice of productivity.

The molding slurries used in Examples 1 and 2 and Comparative Examples 1 to 4 were heat treated at 1,000° C. for one hour whereupon the contents of $SiO_2$ and CaO were determined, with the results shown in Table 3.

TABLE 3

| Dispersant | Amount of dispersant added (wt %) | $SiO_2$ (wt %) | CaO (wt %) |
|---|---|---|---|
| EX 1 | sorbitol | 0.93 | 0.47 | 0.65 |
| EX 2 | sorbitol | 0.93 | 0.47 | 0.65 |
| CE 1 | gluconic acid | 1 | 0.47 | 0.59 |
| CE 2 | gluconic acid | 1 | 0.40 | 0.48 |
| CE 3 | none | — | 0.47 | 0.65 |
| CE 4 | none | — | 0.47 | 0.66 |

When gluconic acid was added, a reduction of CaO content was observed, and at higher pH, a more reduction of CaO content and a reduction of $SiO_2$ content were observed. Coercivity HcJ dropped in Comparative Example 2 because of a shift in composition by leaching of these additives. These problems were eliminated when sorbitol was added. It is noted that leaching of the additives is suppressed when the calcium salt of gluconic acid is used.

Equivalent results to Examples 1 and 2 were obtained when mannitol was used instead of sorbitol as the dispersant.

Examples 3–13 and Comparative Examples 5–11

To achieve the desired composition:

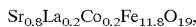

$Sr_{0.8}La_{0.2}Co_{0.2}Fe_{11.8}O_{19}$, the starting raw materials shown below were used.
  $Fe_2O_3$ powder (containing Mn, Cr, Si and Cl impurities)
  $SrCO_3$ powder (containing Ba and Ca impurities)
  Cobalt oxide powder
  $La_2O_3$ powder
  As additives, $SiO_2$ and $CaCO_3$ powders were added in amounts of 0.2% and 0.15% by weight based on the desired composition.

The starting raw materials and additives were comminuted in a wet attritor, dried, classified, and then fired in air at 1,200° C. for 3 hours, yielding a granular calcined material. The calcined material was subjected to dry coarse comminution in a vibrating mill.

The calcined particles were then mixed with water as a dispersing medium and a dispersant as shown in Table 4 as well as 0.4% and 1.25% by weight (based on the calcined particles) of $SiO_2$ and $CaCO_3$, respectively, to form a slurry to be milled. The amount of the dispersant expressed in percent by weight based on the calcined particles is shown in Table 4. It is noted that calcium gluconate used herein was monohydrate and its amount was calculated as gluconate ion. The slurry to be milled had a solid concentration of 34% by weight.

Aside from using the dispersant shown in Table 4, molded parts were obtained as in Example 1. These molded parts were measured as in Example 1, with the results shown in Table 4.

TABLE 4

| Dispersant | Number of carbon atom | Amount of dispersant added (wt %) | pH | Degree of orientation by X-ray of molded part, $\Sigma I(00L/\Sigma I(hkL)$ | Frequency of cracking upon parting |
|---|---|---|---|---|---|
| EX 3 | sorbitol | 6 | 0.05 | 8.5 | 0.50 | 2/5 |
| EX 4 | sorbitol | 6 | 0.1 | 8.9 | 0.51 | 1/5 |
| EX 5 | sorbitol | 6 | 0.3 | 9.4 | 0.56 | 0/5 |
| EX 6 | sorbitol | 6 | 0.5 | 9.4 | 0.58 | 0/5 |
| EX 7 | sorbitol | 6 | 1.0 | 9.6 | 0.58 | 1/5 |
| EX 8 | sorbitol | 6 | 2.0 | 9.6 | 0.61 | 1/5 |
| EX 9 | sorbitol | 6 | 3.0 | 9.3 | 0.62 | 2/5 |
| EX 10 | xylitol | 5 | 0.5 | 9.6 | 0.55 | 2/5 |
| EX 11 | xylitol | 5 | 1.0 | 9.7 | 0.58 | 2/5 |
| EX 12 | mannitol | 6 | 0.5 | 9.5 | 0.55 | 1/5 |
| EX 13 | mannitol | 6 | 1.0 | 9.6 | 0.55 | 1/5 |
| CE 5 | none | — | — | 9.2 | 0.48 | 1/5 |
| CE 6 | calcium gluconate | 6 | 0.5 | 9.7 | 0.57 | 2/5 |
| CE 7 | calcium gluconate | 6 | 1.0 | 8.6 | 0.59 | 3/5 |
| CE 8 | ethylene glycol | 2 | 0.5 | 9.1 | 0.48 | 2/5 |
| CE 9 | ethylene glycol | 2 | 1.0 | 8.8 | 0.49 | 0/5 |
| CE 10 | glycerin | 3 | 0.5 | 9.1 | 0.48 | 2/5 |
| CE 11 | glycerin | 3 | 1.0 | 9.2 | 0.49 | 2/5 |

It is evident from Table 4 that ethylene glycol $HOCH_2CH_2OH$ and glycerin $CH_2(OH)CH(OH)CH_2OH$ wherein the number of carbon atoms, n, is 3 or less are outside the scope of the invention and ineffective in improving the degree of orientation.

It is also seen from Table 4 that molded parts with a high degree of orientation are obtainable even when the amount of sorbitol added is changed over a wide range. The addition of sorbitol, xylitol and mannitol is effective for reducing the frequency of cracking upon mold parting as compared with the addition of calcium gluconate.

The molded part with calcium gluconate added thereto in Comparative Example 7 cracked when it was rapidly dried. The molded parts with sorbitol, xylitol and mannitol added thereto in Examples 3 to 13 did not crack upon rapid drying.

The molded parts were fired into sintered parts which exhibited a degree of magnetic orientation and a remanence corresponding to the degree of orientation of the molded parts. The sintered part cracked when the amount of sorbitol added was increased to 5.5% by weight.

When conventional dispersants such as calcium gluconate and gluconic acid are added, the resulting molded parts have an outer appearance which is vulnerable to drying conditions. For example, when such molded parts are rapidly dried or when molded parts are allowed to stand for a long period of time, cracks will develop on the surface or a surface layer will peel off. In the mass-scale manufacture, this problem leads to a lowering of manufacturing yield and an increased drying lead time. When the inventive dispersant such as sorbitol is used, few or no cracks develop under similar drying conditions.

Five samples were furnished for each of Example 7 and Comparative Example 7. They were dried at 100° C. for one hour, and the frequency of cracking incurred during the drying period was determined. The results are shown in Table 5.

TABLE 5

Cracking frequency upon drying
(addition amount 1.0 wt %, n = 5, 100° C./1 h)

| | Dispersant | Cracking frequency |
|---|---|---|
| Example 7 | sorbitol | 0% |
| Comparative Example 7 | calcium gluconate | 100% |

These data demonstrate the effectiveness of the invention.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing an oxide magnetic material, comprising the step of wet molding a slurry containing a particulate oxide magnetic material and water in a magnetic field to form a molded part, the slurry further containing a polyhydric alcohol having the general formula: $C_n(OH)_nH_{n+2}$ as a dispersant, wherein the number of carbon atoms, n, in the polyhydric alcohol is at least 4.

2. The method of claim 1 wherein the number of carbon atoms, n, in the polyhydric alcohol is up to 100.

3. The method of claim 2 wherein the number of carbon atoms, n, in the polyhydric alcohol is up to 20.

4. The method of claim 1 wherein the polyhydric alcohol is sorbitol.

5. The method of claim 1 wherein the polyhydric alcohol is mannitol.

6. The method of claim 1 further comprising a wet comminution step prior to the molding step.

7. The method of claim 6 wherein at least a portion of said dispersant is added in the wet comminution step.

8. The method of claim 6 further comprising a dry coarse comminution step prior to the wet comminution step.

9. The method of claim 8 wherein at least a portion of said dispersant is added in the dry coarse comminution step.

10. The method of claim 1 wherein said dispersant is added in an amount of 0.05 to 5.0% by weight based on said particulate oxide magnetic material.

11. The method of claim 1 wherein said particulate oxide magnetic material has an average particle diameter of up to 1 μm.

12. The method of claim 1 further comprising the step of firing the molded part into a sintered part.

13. An oxide magnetic material obtained by the method of any one of claims 1 and 2 to 11.

14. A slurry containing a particulate oxide magnetic material and water used in a method for preparing an oxide magnetic material, comprising the step of wet molding the slurry in a magnetic field to form a molded part, the slurry further containing a polyhydric alcohol having the general formula: $C_n(OH)_nH_{n+2}$ as a dispersant, wherein the number of carbon atoms, n, in the polyhydric alcohol is at least 4.

15. The slurry of claim 14 wherein the number of carbon atoms, n, in the polyhydric alcohol is up to 100.

16. The slurry of claim 15 wherein the number of carbon atoms, n, in the polyhydric alcohol is up to 20.

17. The slurry of claim 14 wherein the polyhydric alcohol is sorbitol.

18. The slurry of claim 14 wherein the polyhydric alcohol is mannitol.

* * * * *